Patented Feb. 23, 1937

2,071,377

UNITED STATES PATENT OFFICE 2,071,377

LAMINATED SAFETY GLASS

William J. Arner and Roy W. Wampler, Toledo, Ohio, assignors to Libbey-Owens-Ford Glass Company, Toledo, Ohio, a corporation of Ohio No Drawing. Application June 28, 1934, Serial No. 732,835

2 Claims. (Cl. 49—81)

The present invention relates to the art of laminated safety glass manufacture and more particularly to a bonding material or adhesive for use in the joining together of cellulose acetate plastic and glass laminations.

Laminated safety glass ordinarily comprises two sheets of glass with an interposed layer of tough transparent plastic adherent to the inner surfaces of the glass sheets. Cellulose acetate plastic constitutes a desirable plastic layer for such glass but the art has met with difficulties in obtaining a consistently satisfactory and adequate bond between cellulose acetate plastic and glass laminations.

The present invention relates particularly to the making and use of an improved adhesive which will give consistently good results in bonding together cellulose acetate plastic and glass laminations.

Broadly speaking, the adhesive produced in accordance with our invention is obtained by reacting cellulose acetate with a mixture of two or more acids and then subsequently dissolving or dispersing the reaction product so formed in suitable high boiling point, low vapor pressure solvents and plasticizers.

We have found that a commercially satisfactory adhesive can be made by introducing 50 parts of cellulose acetate into 834 parts of water together with 7 parts of concentrated C. P. hydrochloric acid and 11 parts of 75% ortho-phosphoric acid. This mixture is then heated and allowed to react while being rapidly agitated at a temperature of about 195 to 208 degrees Fahrenheit for a period of approximately two hours.

The reaction product thus formed is then washed substantially free from the acid solution and dried in an oven at a temperature of approximately 200 to 212 degrees Fahrenheit for about fifteen hours. The reaction product may then be dissolved or dispersed in suitable high boiling point, low vapor pressure solvents and plasticizers which will give an excellent adhesive for cellulose acetate plastic and glass laminations.

We have found that commercial cellulose acetate obtainable from the manufacturers thereof varies so that the ratio of acids above set forth may be changed for the particular type and grade of cellulose acetate used.

Also the different grades of raw cellulose acetate require slightly different treatments, the variation in the ratio of hydrochloric acid to ortho-phosphoric acid producing variations in the quality of the final material and the variation of the total acidity for any certain ratio produces variations in the quality.

Generally speaking, when the ratio of acids is as given in the example above, the quality of the adhesive and consequently the quality of the finished laminated safety glass, insofar as it is affected by the adhesive, is extremely good, and as variations from this ratio are made, we have found that the quality progressively decreases. We have discovered that when greatly increasing or greatly decreasing the total active quantity of acid in the mixture, the quality becomes correspondingly poor.

A number of different plasticizers or high boiling point, low vapor pressure solvents will work satisfactorily when used to disperse or dissolve the reaction product produced by reacting cellulose acetate in a mixture of dilute hydrochloric and ortho-phosphoric acids. For example, dimethyl phthalate, diethyl phthalate, triacetin, ethyl lactate, benzyl alcohol, benzyl acetate, or various combinations or mixtures of these plasticizers and solvents can be used. Likewise, experimentation has shown that the ratios of the reaction product and plasticizers or solvents can be controlled within wide limits. For example, excellent results have been obtained by using as an adhesive a mixture containing 5% of the reaction product in dimethyl phthalate. Likewise, excellent results have been obtained by using as an adhesive mixture 70 parts of the reaction product dispersed in 30 parts of dimethyl phthalate. In the latter mixture, it is of course necessary that it be diluted with suitable volatile solvents such as acetone, ethyl acetate, or the like to obtain the desirable consistency for spraying or otherwise coating the adhesive in a relatively thin film on either the glass or cellulose acetate plastic surfaces.

It will be appreciated that in the selection of plasticizers or solvents for use in the placing of the reaction product in solution, such plasticizers and solvents as are intended to remain in the safety glass should be of such character that they will be stable in the safety glass and will not tend to adversely affect the cellulose acetate plastic. In those cases where the volatile solvents or thinning agents such as acetone are employed as a part of the solvent mixture, it will be understood that we prefer to permit evaporation of such volatile solvents from the adhesive film prior to the bonding of the various laminations together.

Another example of a procedure that can be followed in producing an adhesive in accordance with the present invention consists in making a mixture comprising 5.2 parts of hydrochloric acid, 1.8 parts of ortho-phosphoric acid, 160 parts acetone, and 10 parts cellulose acetate. The mixture can then be refluxed for two hours on a steam bath and the reaction product precipitated by pouring into a large volume such as 2,000 parts of water. This material, when dissolved in acetone with an equal weight of dimethyl phthalate, gives an adhesive possessing very good adhesive properties for bonding cellulose acetate plastic and glass laminations.

Another specific example of the use of two acids in the making of an adhesive in accordance with our invention is given wherein 50 parts of cellulose acetate is introduced into 834 parts of water together with 7 parts of concentrated C. P. hydrochloric acid and 5½ parts of concentrated nitric acid. This mixture is then heated and allowed to react while being rapidly agitated at a temperature of about 195 to 208 degrees Fahrenheit for approximately two hours.

The reaction product thus formed is washed, dried, and dispersed in suitable high boiling point, low vapor pressure solvents and plasticizers as in the example given above.

To produce laminated safety glass using our adhesive, either the glass sheets or the sheet of cellulose acetate plastic may be coated with a film of the adhesive. This coating can be accomplished by film spreading rolls, spray guns, or the like, and obviously the consistency of adhesive used will be dependent upon the type of apparatus employed in applying the adhesive to the laminations. Likewise, the adhesive may be heated to facilitate spreading.

After the laminations have been properly coated with the adhesive, the plastic may be inserted between the glass sheets to produce a sandwich and the sandwich thus formed can be subjected to the combined action of heat and pressure to effect final compositing. A temperature of about 300° F. coupled with a pressure of from 40 to 200 pounds per square inch for a period of from six to eight minutes will be sufficient to give satisfactory commercial adhesion between the laminations.

We claim:

1. The process of producing an adhesive for the manufacture of transparent laminated safety glass comprising two sheets of glass and an interposed adherent layer of cellulose acetate plastic, including the steps of forming a reaction product by treating cellulose acetate with a mixture of hydrochloric acid and ortho-phosphoric acid, and then dissolving the same in a plasticizer therefor.

2. The process of producing an adhesive for the manufacture of transparent laminated safety glass comprising two sheets of glass and an interposed adherent layer of cellulose acetate plastic, including the steps of forming a reaction product by treating cellulose acetate with a mixture of dilute hydrochloric acid and ortho-phosphoric acid, and then dissolving the same in a plasticizer therefor.

WILLIAM J. ARNER.
ROY W. WAMPLER.